Nov. 27, 1934.  E. SHIELDS ET AL  1,982,543
ELECTRIC CONTROL MEANS FOR AIR BRAKES
Filed Feb. 11, 1932   3 Sheets-Sheet 1
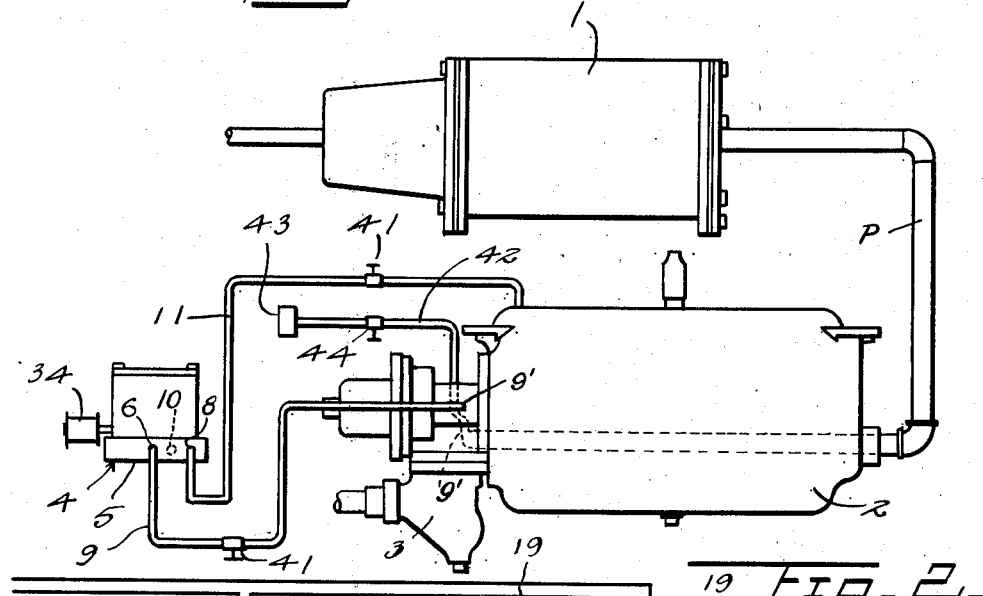
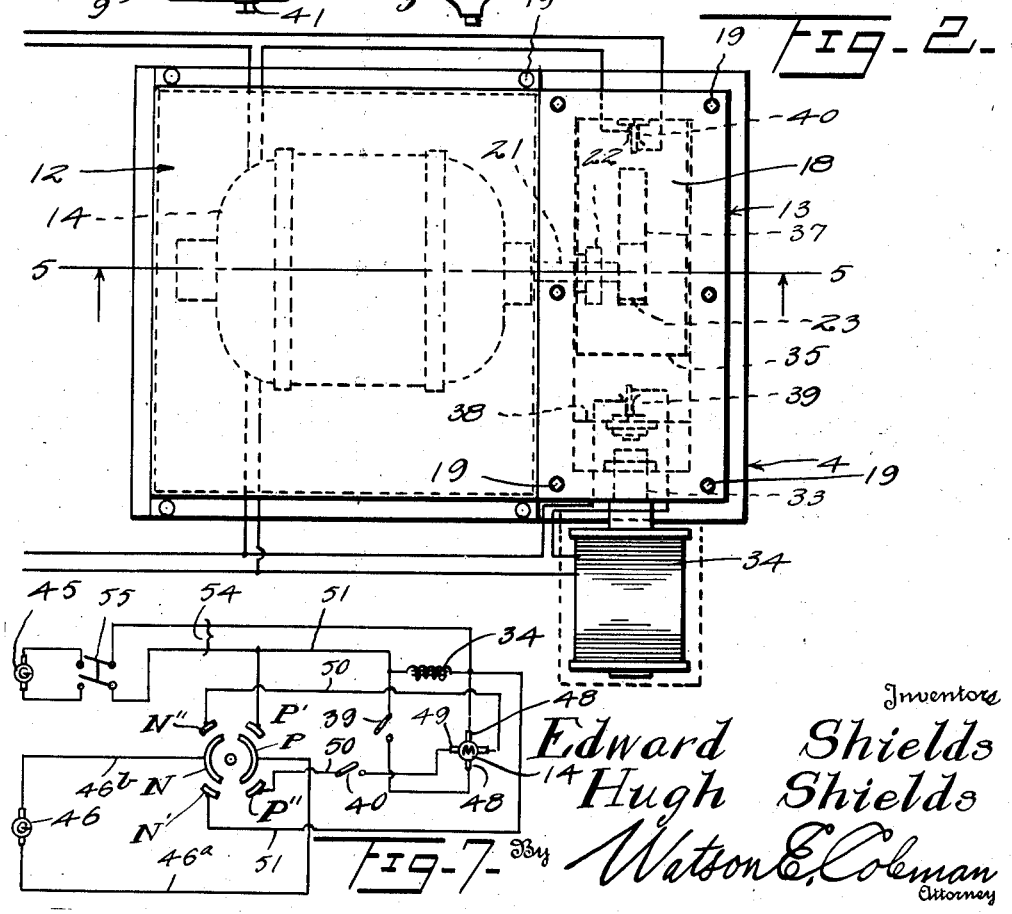
Inventors
Edward Shields
Hugh Shields
By Watson E. Coleman
Attorney

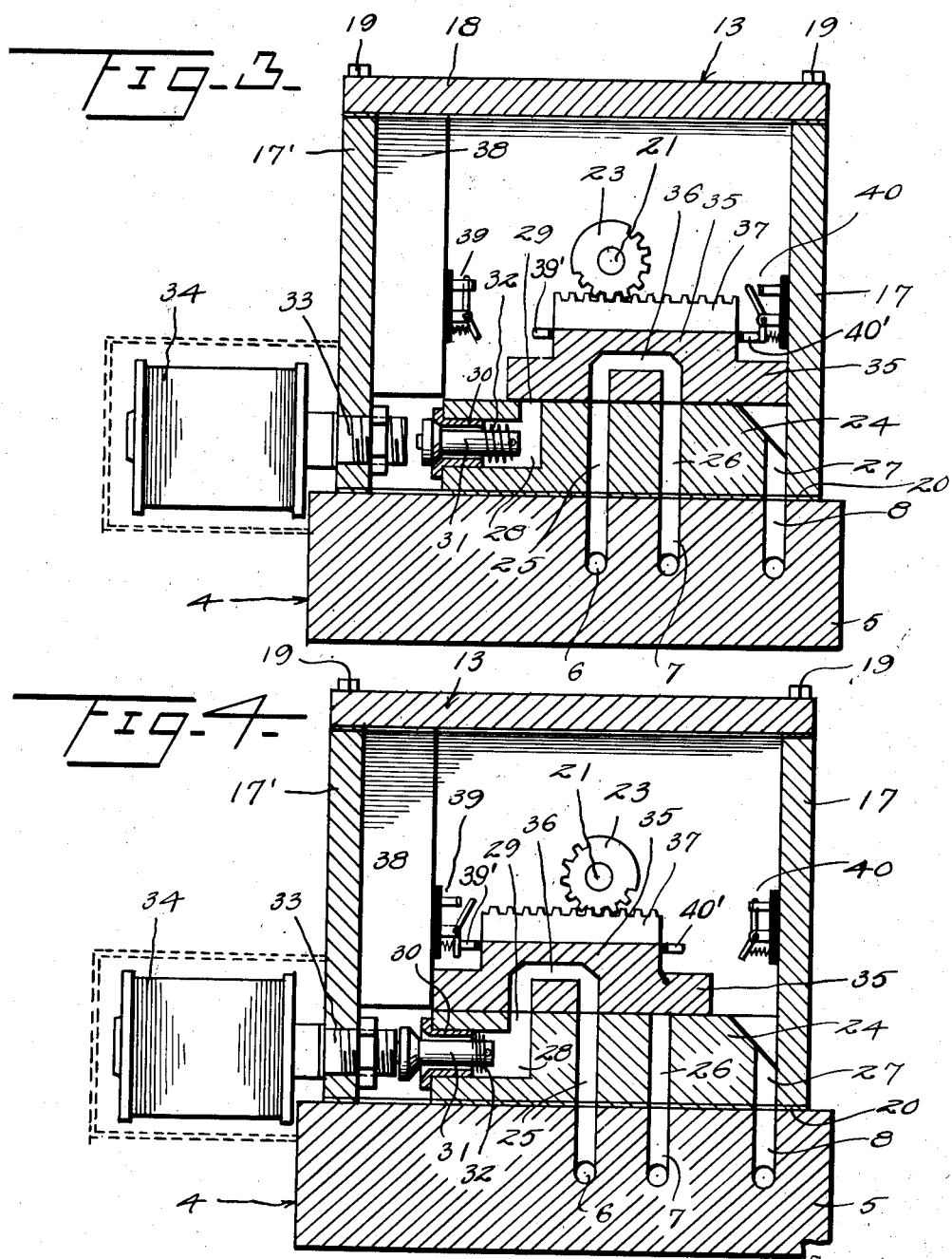

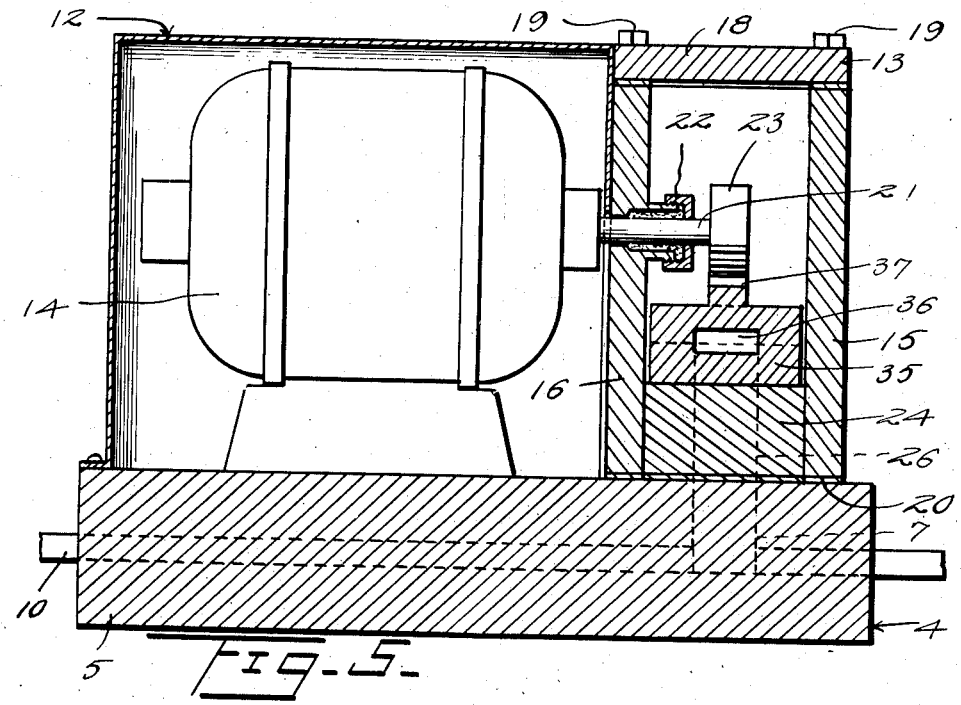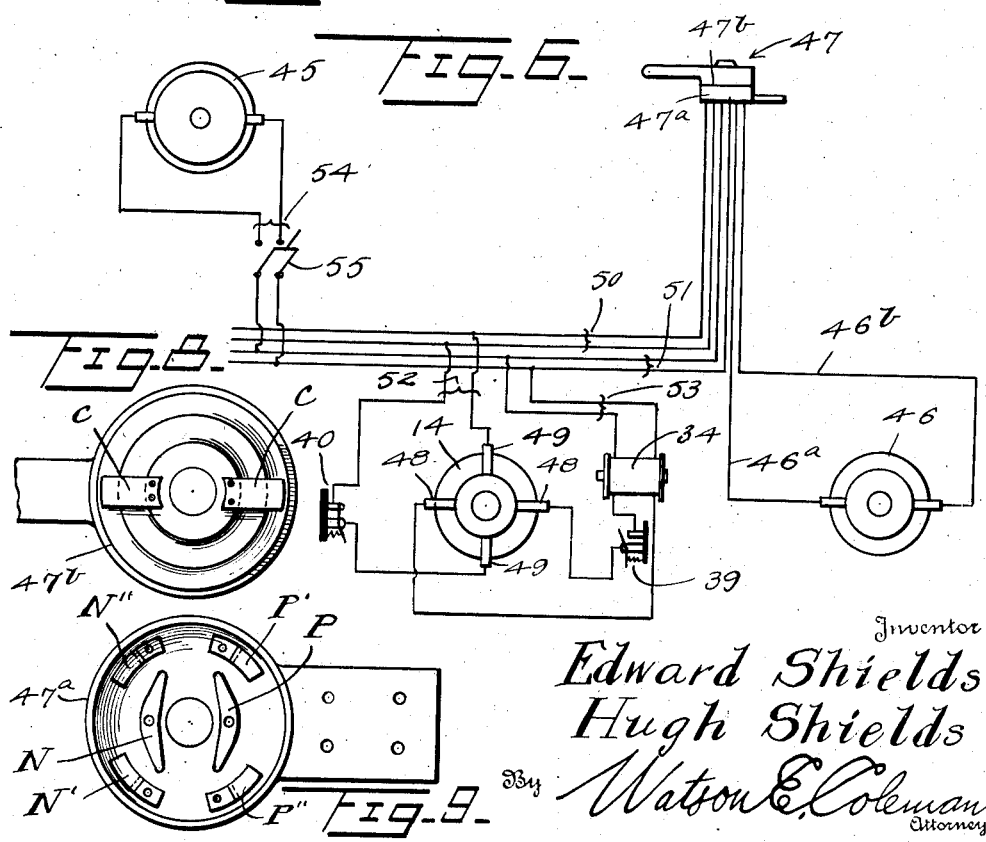

Patented Nov. 27, 1934

1,982,543

UNITED STATES PATENT OFFICE 1,982,543

ELECTRIC CONTROL MEANS FOR AIR BRAKES

Edward Shields, El Paso, Tex., and Hugh Shields, Alamogordo, N. Mex.

Application February 11, 1932, Serial No. 592,354

10 Claims. (Cl. 303—15)

This invention relates to the class of air brakes and pertains particularly to means for electrically controlling the same.

The primary object of the present invention is to provide a mechanism for introducing air into the brake cylinder of an air brake structure directly from the auxiliary reservoir by means of an electrically actuated valve under the control of the operator of the rolling stock upon which the air brake is mounted.

Another object of the invention is to provide an electrically actuated slide valve for directing the flow of air to and from the brake cylinder of an air brake structure and electric means operating simultaneously with the movement of the slide valve to one position to open a second valve and permit air to flow from the auxiliary reservoir of the air brake structure through the slide valve to the brake cylinder.

A still further object of the invention is to provide electrically operated means for transferring air under pressure from the auxiliary reservoir to the brake cylinder through the usual pipe line, which is connected to and makes use of ports in the triple valve forming a part of the usual air brake mechanism without in any way interfering with the operation of the latter for replenishing the auxiliary reservoir from the brake pipe.

Other objects and advantages of the invention will become apparent as the description of the same proceeds and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a diagrammatic view of an air brake structure showing the connection therewith of the device embodying the present invention;

Figure 2 is a view in top plan of the valve unit and operating means therefor, of the device embodying the present invention;

Figure 3 is a sectional view taken transversely of the valve chamber of the unit shown in Figure 2;

Figure 4 is a view similar to Figure 2 showing the slide valve in position for applying the air brake;

Figure 5 is a sectional view taken on the line 5—5 of Figure 2;

Figure 6 is a view illustrating the circuit diagram for the present invention.

Figure 7 is a circuit diagram showing the connections between the brake operating motor, the control switch in the engineer's cab and the two generators by either of which the operation of the motor can be effected.

Figure 8 is a plan view of the inner face of the top or movable unit of the engineer's control switch;

Figure 9 is a plan view of the inner face of the lower or fixed portion of the engineer's switch with which the unit of Figure 8 is associated.

Referring now more particularly to the drawings wherein like numerals of reference indicate corresponding parts throughout the several views, there are illustrated in Figure 1 the brake piston cylinder 1, auxiliary reservoir 2 and triple valve 3 of an air brake mechanism of the usual well known construction and in association with which a portion of the mechanism embodying the present invention is used, the portion of the mechanism referred to being indicated generally by the numeral 4.

The mechanism embodying the present invention comprises a unit base 5 through the top of which there opens, adjacent one end, the three ports 6, 7 and 8. These ports have connected respectively therewith, through suitable passageways in the base, the air pipes 9, 10 and 11.

Mounted upon the base 5 are two chamber forming structures which are indicated generally by the numerals 12 and 13. The chamber forming structure 12 may be constructed of sheet metal or any other suitable material as it serves merely as a protective housing for a reversible four brush motor 14 which is mounted upon the base 5 in the manner illustrated. The chamber forming structure 13, however, has the front and rear walls 15 and 16, the end walls 17 and 17', and the top wall 18 formed of relatively heavy material and secured firmly in position on the base by suitable long cap screws 19.

This structure overlies the three ports 6, 7 and 8 and in addition the joints between the front, rear and end walls and the top 18 and base 5 are made leak-proof by use of suitable gaskets 20 as the interior of this chamber forming structure 13 must contain air under relatively high pressure.

The rear wall 16 of the chamber 13 has the armature shaft 21 of the motor 14 extended therethrough and also extended through a suitable packing gland 22 which prevents the leakage of compressed air within the chamber 13 and within this chamber the armature shaft has mounted thereon the gear segment 23.

Positioned in the chamber 13 upon the base 5 is a slide valve seat in the form of an elongated block 24. This block at one end abuts the end wall 17 of the chamber, while its other end is spaced from the opposite end wall 17'. Formed vertically through the seat block 24 are the three passages 25, 26 and 27 which coincide respectively with the passages 6, 7 and 8, the passage 27 opening into a cut-out formed across the top end edge of the seat block as illustrated.

In the end of the seat block 24 which is adjacent the wall 17' there is formed a chamber 28 which at its inner end opens through the top of the seat block by the passage 29 and which has removably secured in its other end the reciprocable valve carrying sleeve 30 the valve therein being indicated by the numeral 31.

At its inner end this valve 31 has surrounding it a coil spring 32 which normally maintains the valve on the seat formed on the outer end of the sleeve 30 and, therefore, in closed position, as illustrated in Figure 3. This valve 31 is directed toward the adjacent side wall 17' and is in spaced relation therewith and extending through and secured in this end wall 17' is the core 33 of an electro-magnet 34, the magnet being positioned exteriorally of the chamber 13 and the core 33 thereof being aligned with the valve body 31.

Mounted on top of the seat block 24 is a sliding valve body 35 in which is formed the usual D-shaped passage 36 the ends of which open downwardly through the bottom of the valve body. The top of this sliding valve body carries a rack 37 which extends longitudinally thereof and which is in toothed engagement with the segment 23.

Within the chamber 13 on the end wall 17' thereof there is a movement limiting block 38 for the slide valve 35 and mounted upon the inner face of this movement limiting block 38 is a snap switch 39 which is normally closed but is moved to open position by the insulation finger 39' on the sliding valve when the latter is shifted toward the end wall 17'. Upon the wall 17 there is also mounted a snap switch similar to the switch 39 and which is indicated by the numeral 40 and this snap switch is also normally in closed position but is opened by the insulation finger 40' on the valve body 35 when the latter is moved toward the wall 17.

The pipe 9 is connected as illustrated in Figure 1 with the exhaust port of the triple valve 3 and the pipe 11 is tapped into the auxiliary reservoir 2 so as to conduct air therefrom through the passage 27 of the seat block and into the chamber 13. These pipes 9 and 11 are provided with suitable hand valves 41 so that the pipes may be closed off when desired. The pipe 10 discharges exhaust air from the device and may terminate at the rear thereof or may be extended to discharge the air at a point remote therefrom. There is also connected with the exhaust port of the triple valve, as shown in Figure 1, a pipe 42 which leads to the retaining valve 43, and this pipe has a hand valve 44 therein by which it may be closed. The hand valve 44 is kept closed when the electric brake actuating mechanism is in use.

For the operation of the motor 14 upon each car of a train and also for the operation of the electromagnet 34 when the motor is energized to rotate in one direction, there is mounted upon the locomotive the generator 46 which is operated by a steam or other power driven engine (not shown). These elements are conventionally illustrated in Figure 6. There is also provided a second generator 45. This generator will be connected with that portion of the wire which leads to the pair of brushes of the motor 14 through which current passes for the operation of this motor to set the brakes and in the case of freight trains this generator will be carried upon the last car of the train or caboose and will be operated only when the train is in motion through suitable connections with the running gear of the car on which it is mounted. In passenger trains one of these generators 45 will be mounted upon each coach.

The generator 46 which may be termed the master generator has the circuit wires $46^a$ and $46^b$ which are connected with the central contacts in the base of the double throw double pole control switch 47, the base of this switch being indicated by the numeral $47^a$ and the central contacts referred to being indicated by the letters P and N and which are connected respectively with the wires $46^a$ and $46^b$. This base portion $47^a$ of the control switch has two positive contacts P' and P'' therein which are adjacent the positive contact or terminal P connected with one side of the generator 46 and two negative contacts N' and N'' which are disposed adjacent the contact or terminal N with which the wire $46^a$ of the generator 46 is connected. The top portion $47^b$ of the control switch which is rotatably supported on the base $47^a$, carries the oppositely extending bridging contacts C which are disposed between the contacts P' and P'' and the contacts N' and N'' when the switch is in neutral position but are constantly in contact with the contacts P and N.

The switch 47 controls the two circuits 50 and 51. The circuit 50 is connected with the brushes 49 of each brake operating motor 14 of the train line through the bridging circuit 52 and the circuit 51 is connected with the brushes 48 of each motor through the bridging circuit 53. Since the diagram illustrated in Figure 7 is for a single car controlling circuit no distinction has been made between the circuits 50—52 and the circuits 51—53, the circuits leading from the contacts of the switch 47 to the motor 14 being designated merely by the numerals 50 and 51.

As shown, the coil of the electro-magnet 34 bridges the bridging circuit 53 and the limit switch 39 is disposed between the electro-magnet 34 and the motor 14 so that as will be hereinafter more fully described, this switch may be opened and the motor stopped without the electro-magnet being deenergized.

The auxiliary or emergency generator 45 is connected as shown by the circuit 54 across the circuit 51 and this circuit 54 has a switch 55 therein by which it may be controlled. This switch is open at all times and is only employed when an emergency arises making it necessary for someone other than the engineer of the train to apply the brakes.

While it has been stated that the generator 45 is carried at the end of the train in the last coach, it will be apparent that in a passenger train it would be desirable that one of these generators be carried on each passenger coach so that an emergency application of the brakes could be made from any coach if necessary.

In the operation of the present control device by the engineer of the train, when the engineer wishes to apply the brakes the portion 47ᵇ of the control switch will be turned in the proper direction to bridge the contacts P—P' by the bridging contact C and the contacts N—N' by the other bridging contact C. As the generator 46 is running continuously current will then be supplied to the circuit 51 and will pass into the bridging circuit 53 in which each brake motor is connected.

When the brakes are in unapplied position the valve 35 will be in the position shown in Figure 3 of the drawings and the limit switch 39 will thus be closed. Therefore, the motor will be energized when the switch 47 has been moved in the manner described for the applying of the brakes, and it will turn in the proper direction to shift the slide valve 35 to the position where the passage 36 will bridge the openings 25 and 29. Simultaneously with this operation the electromagnet 34 will be energized and will attract the metallic core of the valve 31, drawing it to the open position shown in Figure 4. Upon the completion of this movement of the parts of the apparatus the slide valve 35 will be in the position shown in Figure 4 and the limit switch 39 will be opened and will thus stop the operation of the motor 14. However, as the electro-magnet 34 is not affected by the opening of the switch 39 it will remain operative as long as the engineer's control switch 47 is in the position described. Upon the opening of the valve 31 air will flow from the auxiliary reservoir 2 through the pipe 11 and into the chamber 13 by way of the passages 8 and 27. From the chamber 13 the air will pass through the open valve 31, through the passages 29, 36 and 25 to the port 6 from which it will flow through the pipe 9 to the exhaust port 9' of the triple valve. From this port the air passes through the usual passages of the triple valve to the pipe P which is connected with the triple valve and passes through the reservoir, as illustrated, to the brake cylinder 1. This pipe P is connected up with the triple valve in the usual manner, its inner end being in communication with the slide valve chamber of the triple valve, with which the exhaust port is in communication, by the usual passage which is indicated in dotted lines by the numeral 9".

It will also be apparent from the foregoing that if a light application only of the brakes is desired the engineer may shift the switch 47 back to neutral position immediately upon the movement of the slide valve 35 to the position where it passes air from the auxiliary reservoir 2 through to the brake cylinder 1, and thus prevent the valve 31 remaining open but for a short time. Since the slide valve 35 will remain in the position to which it has been moved it will be apparent that more air can be sent through to the brake cylinder 1 by the engineer if it is necessary, by merely shifting the switch 47 back to its first position so as to energize the electro-magnet 34 and open the air line controlling valve 31.

When the brakes are to be released the engineer swings the moving portion of the switch 47 over to the extreme opposite position to which it was first moved so as to connect the contacts P'' and N'' with the adjacent center contacts P and N. This will energize the motor through the brushes 49 to rotate in the reverse direction from that previously described so as to shift the slide valve 35 back to the position where the passage 36 bridges the passages 25 and 26. The air in the brake cylinder 1 will then flow back through the pipe P to the triple valve and pass, in the triple valve, through the passage 9" to the exhaust port 9' with which the pipes 9 and 42 are connected. As the valve 44 of the pipe 42 is closed the air will flow from the triple valve exhaust port through the pipe 9 to the port 6 and then through the passages 25, 36 and 26 to and out of the exhaust port 10 of the slide valve unit.

It is, of course, understood that in the operation of the device as just described the valve 44 which is in the pipe line 42 with which the retaining valve 43 is connected will be closed. When the electrically operated mechanism for controlling the air brake structures of each car are not in service the valves or cocks 41 will be closed and the valve 44 opened so that the usual means for actuating the air brake may be employed.

As previously stated the switch 55 which is normally open connects the generator 45 with the circuit 51 when an emergency application of the brakes is desired. Should it be necessary for a trainman to stop the train without signalling the engineer this may be accomplished by the closing of the switch 55 in any one of the coaches of a passenger train or in the caboose of a freight train and the current generated from this machine will be discharged into the circuit 51 and will enter the bridging circuit 53 of each brake motor to operate the same for the application of the brakes in the same manner as described in connection with the operation of the brakes by the manipulation of the switch 47.

It will be seen from the circuit diagrams that after the application of the train brakes by the closing of the switch 55, the brakes can only be released by the manipulation of the engineer's control switch 47.

From the foregoing it will be readily apparent that the present device gives an engineer instant and full control of all brakes in a train without his having to wait for recharge and full auxiliary reservoir pressure can be had in the brake cylinder at any time. In addition, since the triple valve does not operate in applying and releasing the brakes under the control of the present mechanism the auxiliary reservoir will be kept filled at all times with air at the proper pressure so that continued application and release of the brakes is possible without making it necessary for trainmen to visit each brake element for the adjustment of a part as is necessary in the present system when a train is descending a grade and the usual retaining valves must be placed into operation in order that the engineer may keep his brakes partially applied while the pressure in the auxiliary reservoir is being restored. It will also be readily apparent that with all of the foregoing advantageous features of the present mechanism the automatic operation of the brake mechanism is not in any way interfered with so that in the event of leakage, breakage of an air hose or similar accident, the triple valves will operate in the usual manner and automatically apply the brakes.

Having thus described the invention, what is claimed is:—

1. Air flow controlling means for air brakes, comprising an air chamber, means for introducing air under pressure into the chamber, a slide valve block having three ports, one thereof opening into the chamber, a slide valve on said block having a passageway therethrough formed to connect either of two of said ports with the third port, said third port being designed for connection with an air brake cylinder, and switch controlled electrical means for shifting said slide valve in either of two directions on the block.

2. A compressed air controlled valve for the purpose described, comprising a compressed air chamber, means to provide a slide valve receiving seat having three ports opening through the seat, one of said ports having one end opening into the chamber, a reciprocable valve controlling the said one end of the last mentioned port, a slide valve mounted on said seat and having a passage therethrough adapted to connect either of two of said ports with the third port, electric motor means for actuating the said slide valve in either of two directions, and means operating simultaneously with the operation of the motor for the movement of the slide valve in one direction, to open said reciprocable valve.

3. In an air brake system, a brake cylinder, an auxiliary reservoir, a triple valve having connection with said reservoir and further having pipe connection with said brake cylinder, means for conducting air from said auxiliary reservoir to the air brake cylinder, slide valve means controlling the passage of air through said air conducting means, a reversible motor coupled with said slide valve for actuating the same in either of two directions, the actuation of the slide valve in one direction operating to pass air from the reservoir to the brake cylinder and the actuation of the slide valve in the other direction operating to exhaust air from the brake cylinder, means for energizing said motor, and a control switch for said energizing means.

4. In an air brake system, a brake cylinder, an auxiliary reservoir, a triple valve having connection with said reservoir and further having pipe connection with said brake cylinder, means for conducting air from said auxiliary reservoir to the air brake cylinder, slide valve means controlling the passage of air through said air conducting means, a reversible motor coupled with said slide valve for actuating the same in either of two directions, the actuation of the slide valve in one direction operating to pass air from the reservoir to the brake cylinder and the actuation of the slide valve in the other direction operating to exhaust air from the brake cylinder, means for energizing said motor, a control switch for said energizing means, and an electro-magnetically controlled auxiliary valve supplementing the slide valve control of the passage of air from the reservoir to the brake cylinder, the said electro-magnet means being energized simultaneously with the energization of the motor for rotation in one direction.

5. In an air brake system, a brake cylinder, an auxiliary reservoir, a triple valve having connection with said reservoir and further having pipe connection with said brake cylinder, means for conducting air from said auxiliary reservoir to the air brake cylinder, slide valve means controlling the passage of air through said air conducting means, a reversible motor coupled with said slide valve for actuating the same in either of two directions, the actuation of the slide valve in one direction operating to pass air from the reservoir to the brake cylinder and the actuation of the slide valve in the other direction operating to exhaust air from the brake cylinder, means for energizing said motor, a control switch for said energizing means, and a pair of switch elements each controlling the current flow in one direction through the motor and each normally assuming a closed position, said slide valve normally maintaining one of said switches open.

6. In an electrically operated brake system, a brake cylinder, an auxiliary reservoir, a triple valve connected with the auxiliary reservoir and having connection with the brake cylinder, a reversible motor having two pairs of brushes, a source of electro motive force, a pair of electric circuits each having a pair of motor brushes therein, a double pole double throw switch connected with said circuits and said source of E. M. F. for selectively directing electric current to either pair of brushes, an air conducting line leading from said auxiliary reservoir to the exhaust port of said triple valve, a three way valve controlled by said motor and operating upon the rotation of the motor in one direction to discharge air from said auxiliary reservoir through said air conducting line into the said brake cylinder by way of said auxiliary reservoir exhaust port and when operated in the other direction to exhaust the air from the brake cylinder, and an electro-magnetically operated second valve under the control of said double pole double throw switch for regulating the amount of air passed to the brake cylinder when the said three way valve is in brake applied position.

7. In an electrically controlled air brake system, a brake cylinder, an auxiliary reservoir, a triple valve connected with the auxiliary reservoir and having connection with the brake cylinder, an air line connecting the auxiliary reservoir with the exhaust port of the triple valve, an air chamber in said line, a slide valve in said air chamber having a base provided with three ports and a moving element provided with a bridging passage designed to connect either of two of said ports with the third port, the said third port leading to the exhaust port of the triple valve, a second one of said ports opening into the casing, a normally closed electro-magnetically controlled valve controlling the second one of said ports, a reversible electric motor having connection with the moving element of the sliding valve for shifting the same in either of two directions, said motor having two pairs of brushes, a pair of electric circuits, one thereof having a pair of brushes therein and further having the electro-magnet of said magnetically controlled valve bridging it, the second of said circuits having the other pair of motor brushes therein, a source of E. M. F., a double pole double throw switch for selectively connecting said E. M. F. source with either of said circuits, said electro-magnet being energized to open the valve controlled thereby upon the connection of the first circuit with the E. M. F. source, and a limit switch in said first circuit between the electro-magnet and the motor for stopping the motor after the movement of the slide valve element to brake applying position without deenergizing said magnet.

8. In an electrically controlled air brake system, a brake cylinder, an auxiliary reservoir, a triple valve connected with the auxiliary reservoir and having connection with the brake cylinder, an air line connecting the auxiliary reservoir with the exhaust port of the triple valve, an air chamber in said line, a slide valve in said air chamber having a base provided with three ports and a moving element provided with a bridging passage designed to connect either of two of said ports with the third port, the said third port leading to the exhaust port of the triple valve, a second one of said ports opening into the chamber, a normally closed electro-magnetically controlled valve controlling the second one of said ports, a reversible electric motor having connection with the moving element of the sliding valve for shifting the same in either of two directions, said motor having two pairs of brushes, a pair of electric circuits one thereof having a pair of brushes therein and further having the electro-magnet of said magnetically controlled valve bridging it, the second of said circuits having the other pair of motor brushes therein, a source of E. M. F., a double pole double throw switch for selectively connecting said E. M. F. source with either of said circuits, said electro-magnet being energized to open the valve controlled thereby upon the connection of the first circuit with the E. M. F. source, a limit switch in said first circuit between the electro-magnet and the motor for stopping the motor after the movement of the slide valve element to brake applying position without deenergizing said magnet, and a second source of E. M. F. adapted to be connected with said first circuit for the operation of the brake independently of the first mentioned switch.

9. In an air brake structure, a brake cylinder and piston, an auxiliary reservoir, a triple valve connected with the reservoir and having pipe connection with said cylinder, air conducting means leading from said reservoir, a valve structure having a body provided with three ports opening through a seat, a movable element having a passage adapted to connect either of two of said ports with the third port, said air conducting means leading to one of said two ports, the other of said two ports being an exhaust, air conducting means connecting the said third port with the exhaust of the triple valve, motor means for shifting said movable element, means for energizing the motor, and a control switch for coupling the motor and said energizing means.

10. In an air brake structure, a brake cylinder and piston, an auxiliary reservoir, a triple valve connected with the reservoir and having pipe connection with said cylinder, air conducting means leading from said reservoir, a valve structure having a body provided with three ports opening through a seat, a movable element having a passage adapted to connect either of two of said ports with the third port, said air conducting means leading to one of said two ports, the other of said two ports being an exhaust, air conducting means connecting the said third port with the exhaust of the triple valve, motor means for shifting said movable element, means for energizing the motor, a control switch for coupling the motor and said energizing means, and means operated by said valve element for braking the electrical connection between the motor and the energizing means immediately upon connection of either of the two ports with the third port.

EDWARD SHIELDS.
HUGH SHIELDS.